United States Patent
Benedict et al.

(10) Patent No.: US 10,554,580 B2
(45) Date of Patent: Feb. 4, 2020

(54) FABRIC CABLE EMULATION

(71) Applicant: HEWLETT PACKARD ENTERPRISE DEVELOPMENT LP, Houston, TX (US)

(72) Inventors: Melvin K. Benedict, Houston, TX (US); Nilashis Dey, Houston, TX (US); Peter Hansen, Houston, TX (US); John M. Lenthall, Nashua, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 321 days.

(21) Appl. No.: 15/364,530

(22) Filed: Nov. 30, 2016

(65) Prior Publication Data
US 2018/0152394 A1 May 31, 2018

(51) Int. Cl.
*H04L 12/24* (2006.01)
*H04L 12/933* (2013.01)

(52) U.S. Cl.
CPC .................................. *H04L 49/10* (2013.01)

(58) Field of Classification Search
CPC . H04L 45/245; H04L 49/253; H04L 12/4633; H04L 63/01; G06F 15/16; G06F 12/00; G06F 11/0709; G06F 11/3055
USPC .......................................... 709/223; 370/409
See application file for complete search history.

(56) References Cited

U.S. PATENT DOCUMENTS

| | | | |
|---|---|---|---|
| 7,500,032 B2 | 3/2009 | Kim et al. | |
| 8,429,392 B2 | 4/2013 | Miyaychi | |
| 9,064,221 B2 | 6/2015 | Aguren | |
| 9,098,354 B2* | 8/2015 | Arimilli | G06F 9/54 |
| 9,304,960 B2 | 4/2016 | Florentino | |
| 9,325,790 B1* | 4/2016 | Le | H04L 63/083 |
| 2003/0033394 A1* | 2/2003 | Stine | H04L 45/02 709/222 |
| 2013/0132634 A1* | 5/2013 | Liu | G06F 13/28 710/308 |
| 2014/0025846 A1 | 1/2014 | Miyauchi | |
| 2014/0059265 A1* | 2/2014 | Iyer | G06F 9/5011 710/313 |
| 2014/0185627 A1* | 7/2014 | Ditya | H04L 45/44 370/409 |
| 2015/0317092 A1 | 11/2015 | Tanoue et al. | |
| 2017/0017585 A1* | 1/2017 | Iyer | G06F 13/161 |
| 2017/0164500 A1* | 6/2017 | Van Gaal | H04Q 1/15 |

(Continued)

OTHER PUBLICATIONS ywaaw.com, "Upgrade the Data Center to 10GbE," (Web Page), SFP Optics Solution, Mar. 18, 2015, 35 pages, available at http://waawya.ywaaw.com/category/sfp-transceivers/page/3/.

*Primary Examiner* — Tesfay Yohannes
(74) *Attorney, Agent, or Firm* — Sheppard Mullin Richter & Hampton LLP

(57) ABSTRACT

Examples disclosed herein relate to fabric cable emulation. Some examples disclosed herein include determining connection data associated with a connection between a fabric interface of a cluster node in a fabric cluster and a fabric switch. Based on the determined connection data, configuration parameters for the connection may be calculated and stored in a memory device on the cluster node. An interface signal may be asserted to the fabric interface of the cluster node after the calculated configuration parameters are stored to indicate that the cluster node is available in the fabric cluster.

18 Claims, 6 Drawing Sheets

(56) References Cited

U.S. PATENT DOCUMENTS

2017/0262029 A1* 9/2017 Nelson .................... G06F 1/20
2018/0004590 A1* 1/2018 Johnson ................ G06F 11/079

* cited by examiner

FABRIC CABLE EMULATION

BACKGROUND

Computing fabrics may include "fabric"-like interconnections of nodes capable of performing parallel processing functions for high-performance computing.

BRIEF DESCRIPTION OF THE DRAWINGS

The following detailed description references the drawings, wherein.

DETAILED DESCRIPTION

Figure 1:
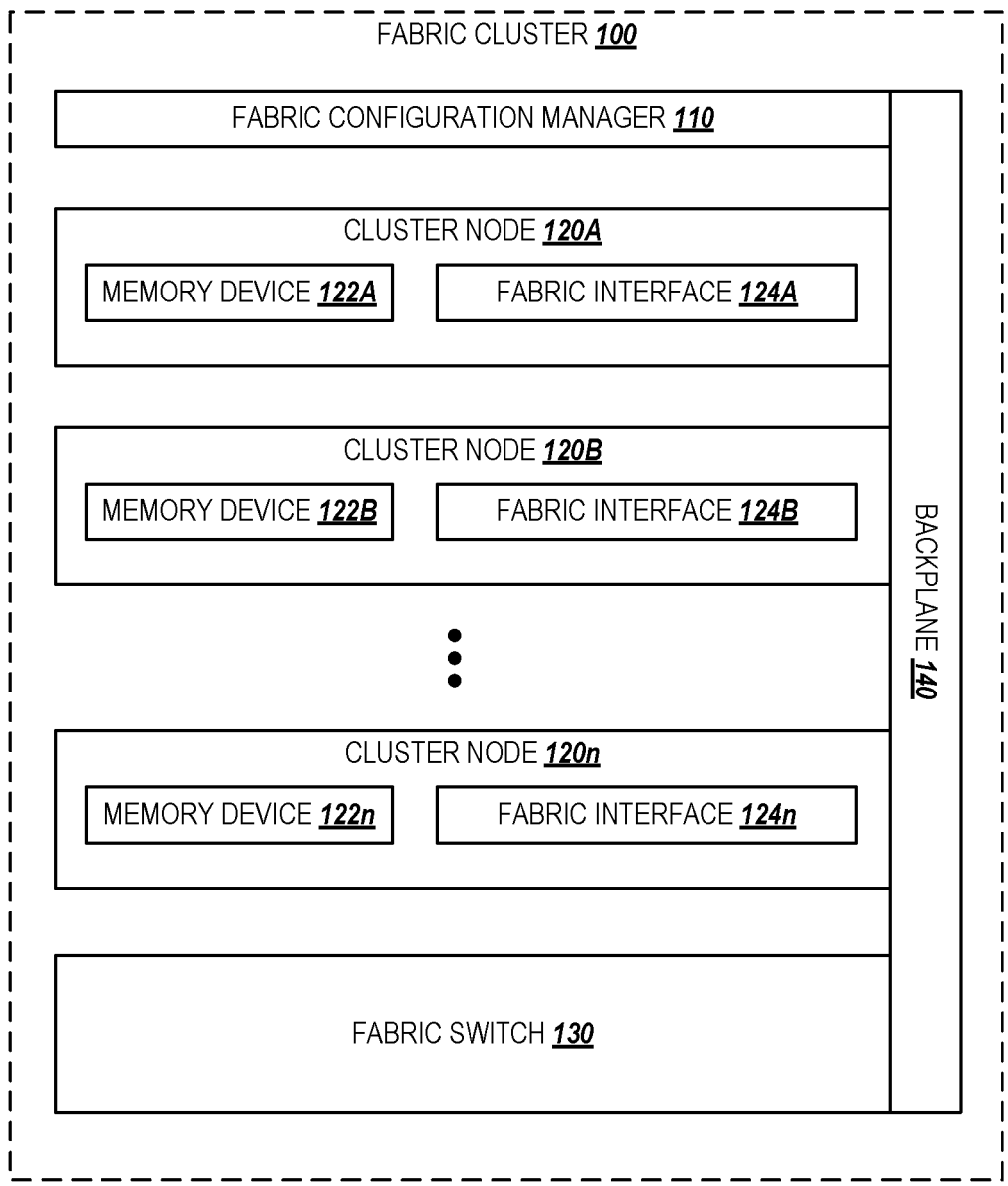
FIG. 1 is a block diagram of an example fabric cluster for fabric cable emulation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

In the world of fabric computing, one implementation for connecting fabric interfaces on nodes to fabric switches (and connecting fabric switches to other fabric switches) includes copper or optical fiber cables that terminate at each end using a connector system such as the quad small form-factor pluggable (QSFP) system. The interconnect cables may include a memory device, such as an electrically erasable programmable read-only memory (EEPROM), that includes configuration parameters associated with the cable, such as a cable identifier, cable length, and channel loss.

As the number of nodes included in rack enclosures continues to increase, the shrinking area dedicated to their interconnections may no longer support cable-based interconnect solutions. However, with the removal of interconnect cables comes the loss of configuration parameters stored in the memory device on the cable.

Examples disclosed herein replace cable-based fabric computing interconnects by connecting fabric interfaces to fabric switches in a rack chassis via a chassis backplane. With the elimination of the fabric cable and connector system comes a significant reduction in space taken up by node-switch interconnections. In the disclosed examples, the fabric cable and connector system may be emulated by locating memory devices on fabric nodes to store the configuration parameters for the connections between the fabric nodes and the fabric switches. The memory devices may include an initial set of configuration parameters generic across the fabric cluster included in the rack chassis. A fabric configuration manager, such as a rack chassis manager, may obtain connection data associated with the connections between fabric nodes and fabric switches included in the fabric cluster. The connection data may be used to calculate the configuration parameters for each connection between a fabric node and fabric switch in the fabric cluster. The calculated configuration parameters may replace the initial configuration parameters in the memory devices on the fabric nodes in the fabric cluster.

FIG. 1 is a block diagram of an example fabric cluster 100 for fabric cable emulation. A fabric cluster, as used herein, may refer to fabric computing systems and portions thereof. For example, fabric cluster 100 may be a switched computing fabric (i.e., a computing fabric in which nodes are interconnected via network switches) that comprises combinations of loosely coupled computing nodes, networking nodes, and/or storage nodes collectively capable of performing high-performance parallel processing functions. In some implementations, fabric cluster 100 may also be referred to as a unified fabric or a data center fabric.

As shown in FIG. 1, fabric cluster 100 may include various components, such as a fabric configuration manager 110 and a plurality of cluster nodes 120A-120n connected to a fabric switch 130 via a backplane 140 of fabric cluster 100. The number and arrangement of these components is an example only and provided for purposes of illustration. Other arrangements and numbers of components may be utilized without departing from the examples of the present disclosure.

In some implementations, fabric cluster 100 may be included in a physical enclosure such as a rack chassis, blade enclosure, server tower, or other types of modular fabric computing enclosures. Cluster nodes 120A-120n may be implemented as blade servers, rack chasses, other types of server modules, storage modules, input/output (I/O) modules, etc. The physical enclosure housing fabric cluster 100 may perform various functions and provide various services to the components included in fabric cluster 100 (e.g., fabric configuration manager 110, cluster nodes 120A-120n, fabric switch 130, etc.), such as supplying power and cooling.

Fabric switch 130 may provide networking functionality for the various components included in fabric cluster 100.

Fabric switch 130 may conform to various types of networking communications standards used in high-performance computing systems. Example high-performance networking communications standard types implemented by fabric switch 130 include InfiniBand, Ethernet, and Fibre Channel. The type of networking communications standard to which fabric switch 130 conforms may determine the type of fabric cluster 100. That is, when fabric switch 130 conforms to the InfiniBand standard, for example, fabric cluster 100 may be referred to as an InfiniBand fabric cluster.

As described above, the interconnects between cluster nodes and fabric switches in a fabric cluster may be implemented using copper and/or optical fabric cable and connector systems such as QSFP, small form-factor pluggable (SFP), multiple-fiber push-on/pull-off (MPO), XFP/XFI, etc. However, to reduce space taken up by the interconnect system, and to increase density of components in fabric cluster 100, fabric cable and connector systems may be replaced by a backplane system, such as backplane 140, in fabric cluster 100. Backplane 140 may be implemented as a set of interconnected sockets on a circuit card assembly into which fabric configuration manager 110, cluster nodes 120A-120n, fabric switch 130, and other components included in fabric cluster 100 may be inserted without the use of fabric cable systems. Backplane 140 may provide the connections between fabric configuration manager 110, cluster nodes 120A-120n, fabric switch 130, and other components included in fabric cluster 100. In addition, backplane 140 may connect the components included in fabric cluster 100 to the power source provided by the physical enclosure in which fabric cluster 100 is included. In some implementations, fabric configuration manager 110, cluster nodes 120A-120n, fabric switch 130, and other components of fabric cluster 100 may be hot swappable in that they may be inserted into fabric cluster 100 (i.e., by being inserted into backplane 140) and removed while fabric cluster 100 is powered and operating.

With the replacement of fabric cable systems by backplane 140 in fabric cluster 100 comes the loss of the EEPROM included in the cable interconnects that stores configuration parameters associated with the connections between cluster nodes 120A-120n and fabric switch 130. To emulate the fabric cable interconnects, a memory device, such as an EEPROM, may be included in each of cluster nodes 120A-120n (e.g., memory devices 122A-122n) to store configuration parameters associated with the connections between cluster nodes 120A-120n and fabric switch 130 via backplane 140. In some implementations, the memory device may be located on a motherboard of the cluster node. In other implementations, the memory device may be located on another circuit card assembly included in the cluster node.

In some implementations, other storage devices may be used instead of EEPROMs. For example, memory devices 122A-122n may be implemented by other non-volatile storage devices, such as FLASH memories and non-volatile random-access memories (NVRAMs) (e.g., NVRAMs utilizing resistive RAMs (RRAMs), spin-transfer torque RAMS (STT-RAMs), magnetic RAMs (MRAMs), conductive-bridging RAMs (CBRAMs), or memristors.

The configuration parameters stored memory devices 122A-122n may include, for example, a channel loss (also referred to as path loss or path attenuation) for the connection between the fabric interface of a cluster node and fabric switch 130. Fabric interfaces 124A-124n included in cluster nodes 120A-120n may access the configuration parameters stored in memory devices 122A-122n on a low-speed sideband interface such as an inter-integrated circuit ($I^2C$) bus or a system management bus (SMBus). For example, fabric interface 124A on cluster node 120A may access the configuration parameters associated with the connection between cluster node 120A and fabric switch 130 in memory device 122A, and so on.

Fabric interfaces 124A-124n may be a combination of electronic hardware/circuitry and software/firmware, and may implemented by various types of networking interface adapters. The type of networking interface adapter used to implement fabric interfaces 124A-124n may depend on the type of communications standard implemented in fabric cluster 100. For example, when fabric cluster 100 implements an InfiniBand communications standard, fabric interfaces 124A-124n may be implemented as host channel adapters (HCAs). As another example, when fabric cluster 100 implements a Fibre Channel communications standard, fabric interfaces 124A-124n may be implemented as host bus adapters (HCBs). As a further example, when fabric cluster 100 implements an Ethernet communications standard, fabric interfaces 124A-124n may be implemented as network interface controllers (NICs).

In some implementations, memory devices 122A-122n may store initial configuration parameters associated with the connection between their respective cluster node and fabric switch 130. The initial configuration parameters may be a set of configuration parameters generic to fabric cluster 100 and may be selected by a system administrator or a manufacturer based on, for example, the type of communications standard implemented by fabric cluster 100. When a cluster node is inserted into fabric cluster 100 (i.e., inserted into backplane 140), and/or during a cluster power sequence of fabric cluster 100, fabric configuration manager 110 may replace the initial configuration parameters in memory devices 122A-122n with calculated configuration parameters for each of cluster nodes 120A-120n.

Fabric configuration manager 110 may be implemented by a computing system, such as a controller or microcontroller, that includes a processor such as a central processing unit (CPU), a dedicated integrated circuit such as an ASIC (application-specific integrated circuit), or a dedicated FPGA (field-programmable gate array). The processor may be a single processor or a plurality of processors. The processor may be capable of executing instructions (e.g., stored on a machine-readable storage medium of fabric configuration manager 110) that, when executed (e.g., by the processor of fabric configuration manager 110), offer the functionality of fabric configuration manager 110 described herein. In some examples, fabric configuration manager 110 may be implemented as a combination of electronic circuitry (i.e., hardware) and software/firmware included in fabric configuration manager 110 that implements the functionality of fabric configuration manager 110. In implementations where fabric cluster 110 is included in a rack chassis, blade enclosure, or other physical enclosure, fabric configuration manager 110 may be implemented by a chassis manager. The chassis manager may manage other aspects of the physical enclosure, such as temperatures, cooling, and power.

To calculate configuration parameters for a connection between a cluster node and switch 130, fabric configuration manager 110 may determine connection data associated with the connection between the fabric interface of the cluster node and fabric switch 130. The connection data may include, for example, a cluster node identifier for the cluster node and a distance between the fabric interface of the cluster node and fabric switch 130. Fabric configuration manager 110 may calculate the configuration parameters for the connection between the fabric interface of the cluster node and fabric switch 130 based on the determined connection data. For example, fabric configuration manager 110 may calculate a channel loss value for the connection between the fabric interface of the cluster node and fabric switch 130 based on the cluster node identifier and/or the distance between the fabric interface of the cluster node and fabric switch 130. The channel loss may be calculated in Decibels as $$\text{Channel Loss} = 20\log_{10}\left(\frac{4\pi d}{\lambda}\right),$$

where d is the distance between the fabric interface of the cluster node and fabric switch 130 and $\lambda$ is the wavelength of the transmissions through the connection.

Fabric configuration manager 110 may store the calculated configuration parameters for the connection between the fabric interface of the cluster node and fabric switch 130 in the memory device on the cluster node. Fabric configuration manager 110 may store the calculated configuration parameters in the memory device by accessing the memory device on a low-speed sideband interface such as an I²C bus or SMBus.

In some implementations, fabric configuration manager 110 may access the memory device on the same low-speed sideband interface that the fabric interface of the cluster node uses to access the memory device. Since there may be two potential master devices on the low-speed sideband interface (i.e., the fabric interface and fabric configuration manager 110), the fabric interface may potentially attempt to access the memory device before (or during) fabric configuration manager 110 updates the stored configuration parameters. In order to prevent this conflict, fabric configuration manager 110 may de-assert an interface signal, such as a "Module Present" interface signal, to the fabric interface as an indication the fabric interface that the cluster node is not available in fabric cluster 100 and that the fabric interface should not access the memory device.

While the interface signal is de-asserted, fabric configuration manager 110 may store the calculated configuration parameters in the memory device. After storing the calculated configuration parameters in the memory device, fabric configuration manager 110 may assert the interface signal to the fabric interface of the cluster node to indicate that the cluster node is available in fabric cluster 100. The fabric interface may then access the stored configuration parameters in the memory device using the low-speed sideband interface.

Figure 2:
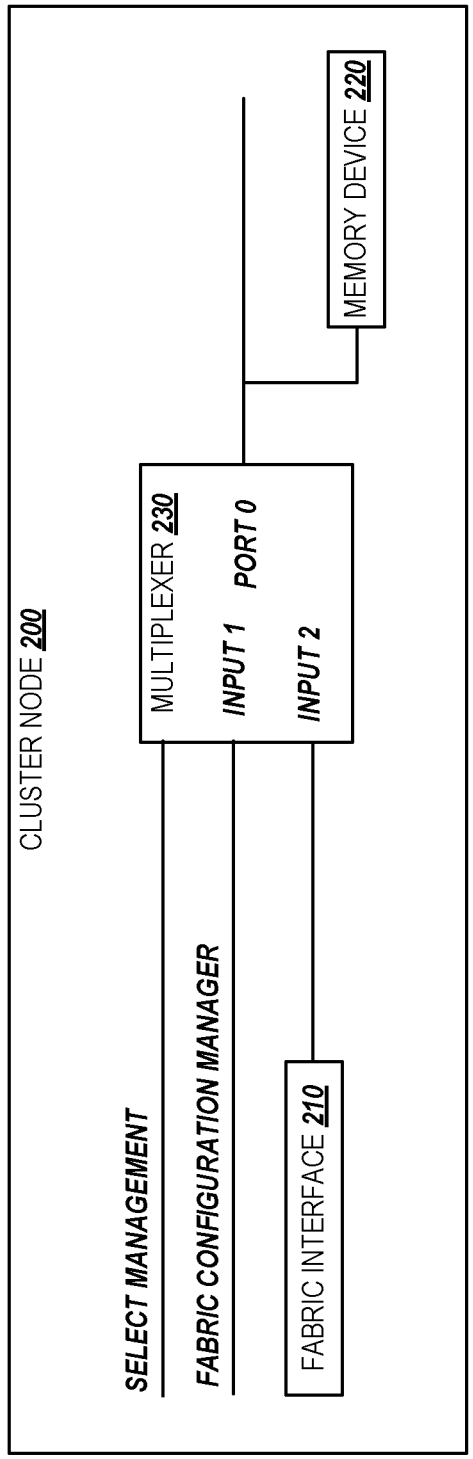
FIG. 2 is a block diagram of an example cluster node for fabric cable emulation.

FIG. 2 is a block diagram of an example cluster node 200 for fabric cable emulation. In some implementations, cluster node 200 may be used to implement cluster nodes 120A-120n of FIG. 1 and their functionalities described above. As shown in FIG. 2, cluster node 200 may include various components, such as a fabric interface 210 and a memory device 220 connected via a multiplexer (MUX) 230. The number and arrangement of these components is an example only and provided for purposes of illustration. Other arrangements and numbers of components may be utilized without departing from the examples of the present disclosure. For example, in some implementations, cluster node 200 may include a plurality of fabric interfaces and memory devices.

MUX 230 may be implemented by hardware or hardware/software multiplexers and may, among other things, provide access to memory device 220. The SELECT MANAGEMENT control line may be used to select an input (e.g., INPUT 1 or INPUT 2) to output at PORT 0. The input lines of INPUT 1 and INPUT 2 may be tied to various components, such as fabric interface 210 and a fabric configuration manager (e.g., fabric configuration manager 110 of FIG. 1). In some implementations, the input lines, SELECT MANAGEMENT control line, and PORT 0 output line may be implemented using a low-speed sideband interface such as I²C or SMBus.

To provide a fabric configuration manager access to memory device 220, the SELECT MANAGEMENT control line may be asserted to activate INPUT 1 on MUX 230. Fabric configuration manager may then access memory device 220 to, for example, store configuration parameters associated with the connection between fabric interface 210 and a fabric switch (e.g., fabric switch 130 of FIG. 1). The SELECT MANAGEMENT control line may then be asserted to activate INPUT 2 on MUX 230 so that fabric interface 210 may access the configuration control parameters stored in memory device 220.

Figure 3:
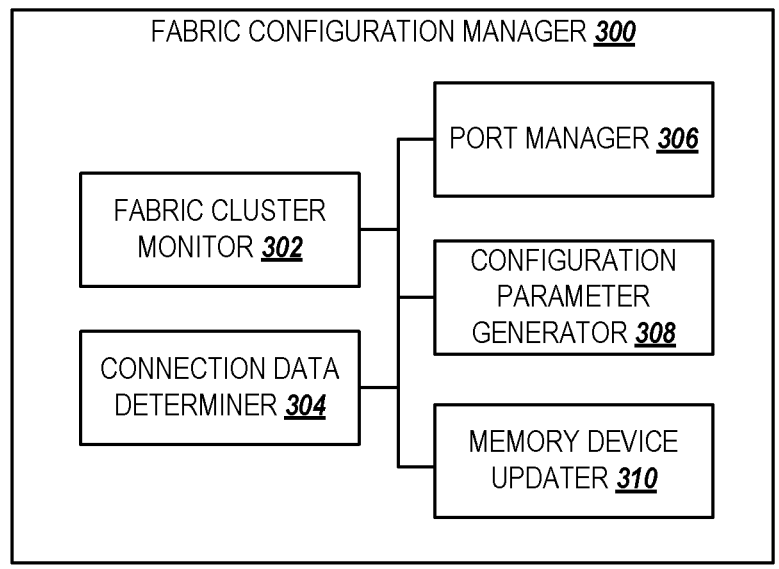
FIG. 3 is a block diagram of an example fabric configuration manager for fabric cable emulation.

FIG. 3 is a block diagram of an example fabric configuration manager 300 for fabric cable emulation. In some implementations, fabric configuration manager 300 may be used to implement fabric configuration manager 110 of FIG. 1 and the functionalities described above.

As shown in FIG. 3, fabric configuration manager 300 may include various components, such as a fabric cluster monitor 302, a connection data determiner 304, a port manager 306, a configuration parameters generator 308, and a memory device updater 310. Fabric configuration manager 300, and each of components 302-310 included therein, may be implemented as hardware or some combination of hardware and software/firmware similarly as described above regarding fabric configuration manager 110 of FIG. 1, generally. The number and arrangement of these components is an example only and provided for purposes of illustration. Other arrangements and numbers of components may be utilized without departing from the examples of the present disclosure.

Fabric cluster monitor 302 may monitor a fabric cluster (e.g., fabric cluster 100 of FIG. 1) for various events. The events may include, for example, a cluster power sequence of the fabric cluster and a cluster node being inserted into the fabric cluster (e.g., a cluster node being inserted or plugged into a backplane of the fabric cluster). Fabric cluster monitor 302 may detect the occurrence of the events and, in response to detecting the events, provide connection data determiner 304 instructions to determine connection data associated with connections between cluster nodes in the fabric cluster and a fabric switch of the fabric cluster.

Port manager 306 may use the connection data determined by connection data determiner 304 to update a port enable matrix for the fabric cluster. The port enable matrix may include a listing of the status of each port on the fabric switch (e.g., enabled or not enabled). Once the port enable matrix has been updated, configuration parameter generator 308 may use the connection data determined by connection data determiner 304 to calculate configuration parameters for the ports that have been enabled on the fabric switch (i.e., for ports in which a cluster node has been inserted). Port manager 306 may use the calculated configuration parameters to develop a switch port map and may send the switch port map to the fabric switch.

Configuration parameter generator 308 may provide the calculated configuration parameters to memory device updater 310. Memory device updater 310 may store the calculated configuration parameters in a memory device on the cluster node to which the calculated configuration parameters are associated. To store the calculated configuration parameters, memory device updater 310 may de-assert a MODULE PRESENT interface signal to indicate to a fabric interface of the cluster node that the cluster node is not available in the fabric cluster. With the interface signal de-asserted, memory device updater 310 may store the calculated configuration parameters in the memory device. Once the calculated configuration parameters have been stored in the memory device, memory device updater 310 may assert the interface signal to the fabric interface of the cluster node to indicate to the fabric interface that the cluster node is now available in the fabric cluster.

Figure 4:
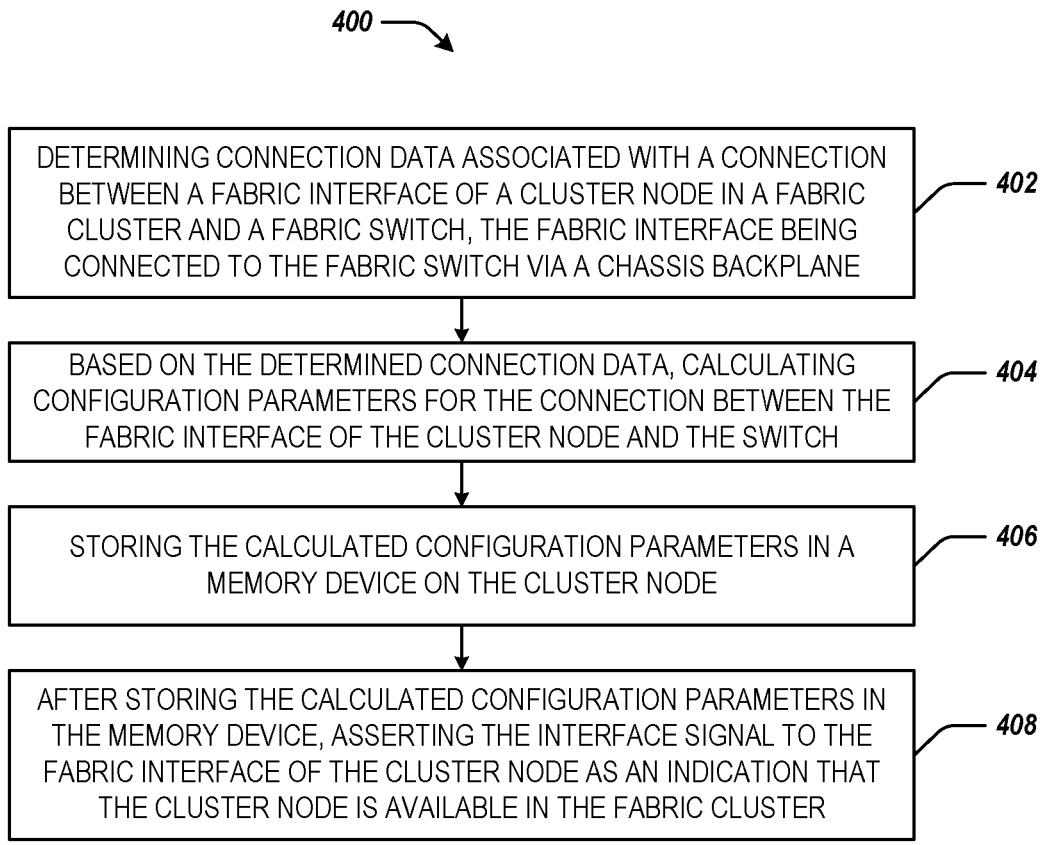
FIG. 4 is a flow diagram depicting an example method for fabric cable emulation.

FIG. 4 is a flowchart depicting an example method 400 for fabric cluster emulation. Method 400 may be executed or performed, for example, by some or all of the system components described above in fabric cluster 100 of FIG. 1 and/or fabric configuration manager 300 of FIG. 3. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, method 400 may include determining connection data associated with a connection between a fabric interface of a cluster node in a fabric cluster and a fabric switch. As an example, fabric configuration manager 110 of fabric cluster 100 shown in FIG. 1 and/or fabric configuration manager 300 of FIG. 3 may be responsible for implementing block 402. In some implementations, the fabric interface may be connected to the fabric switch via a chassis backplane of the fabric cluster. In some implementations, the connection data associated with the connection between the fabric interface of the cluster node and the fabric switch may include a cluster node identifier and a distance between the fabric interface and the fabric switch. In some implementations, the connection data may be determined during a cluster power sequence and/or in response to the cluster node being inserted into the fabric cluster.

At block 404, method 400 may include, based on the determined connection data at block 402, calculating configuration parameters for the connection between the fabric interface of the cluster node and the fabric switch. As an example, fabric configuration manager 110 of fabric cluster 100 shown in FIG. 1 and/or fabric configuration manager 300 of FIG. 3 may be responsible for implementing block 402. In some implementations, calculating the configuration parameters for the connection between the fabric interface of the cluster node and the fabric switch may include calculating a channel loss for the cluster node based on the cluster node identifier and the distance between the fabric interface of the cluster node and the fabric switch.

At block 406, method 400 may include storing the calculated configuration parameters in a memory device on the cluster node. As an example, fabric configuration manager 110 of fabric cluster 100 shown in FIG. 1 and/or fabric configuration manager 300 of FIG. 3 may be responsible for implementing block 402. In some implementations, storing the calculated configuration parameters may include de-asserting the interface signal to the fabric interface of the cluster node to indicate that the cluster node is not available in the fabric cluster and storing the calculated configuration parameters in the memory device on the cluster node while the interface signal is de-asserted. In some implementations, storing the calculated configuration parameters may include replacing initial configuration parameters for the connection between the fabric interface of the cluster node and the fabric switch with the calculated configuration parameters.

At block 408, method 400 may include, after storing the calculated configuration parameters in the memory device, asserting an interface signal to the fabric interface of the cluster node to indicate that the cluster node is available in the fabric cluster. As an example, fabric configuration manager 110 of fabric cluster 100 shown in FIG. 1 and/or fabric configuration manager 300 of FIG. 3 may be responsible for implementing block 402. In some implementations, once the calculated configuration parameters are stored in the memory device, they may be accessed by the fabric interface of the cluster node via a low-speed sideband interface.

Figure 5:
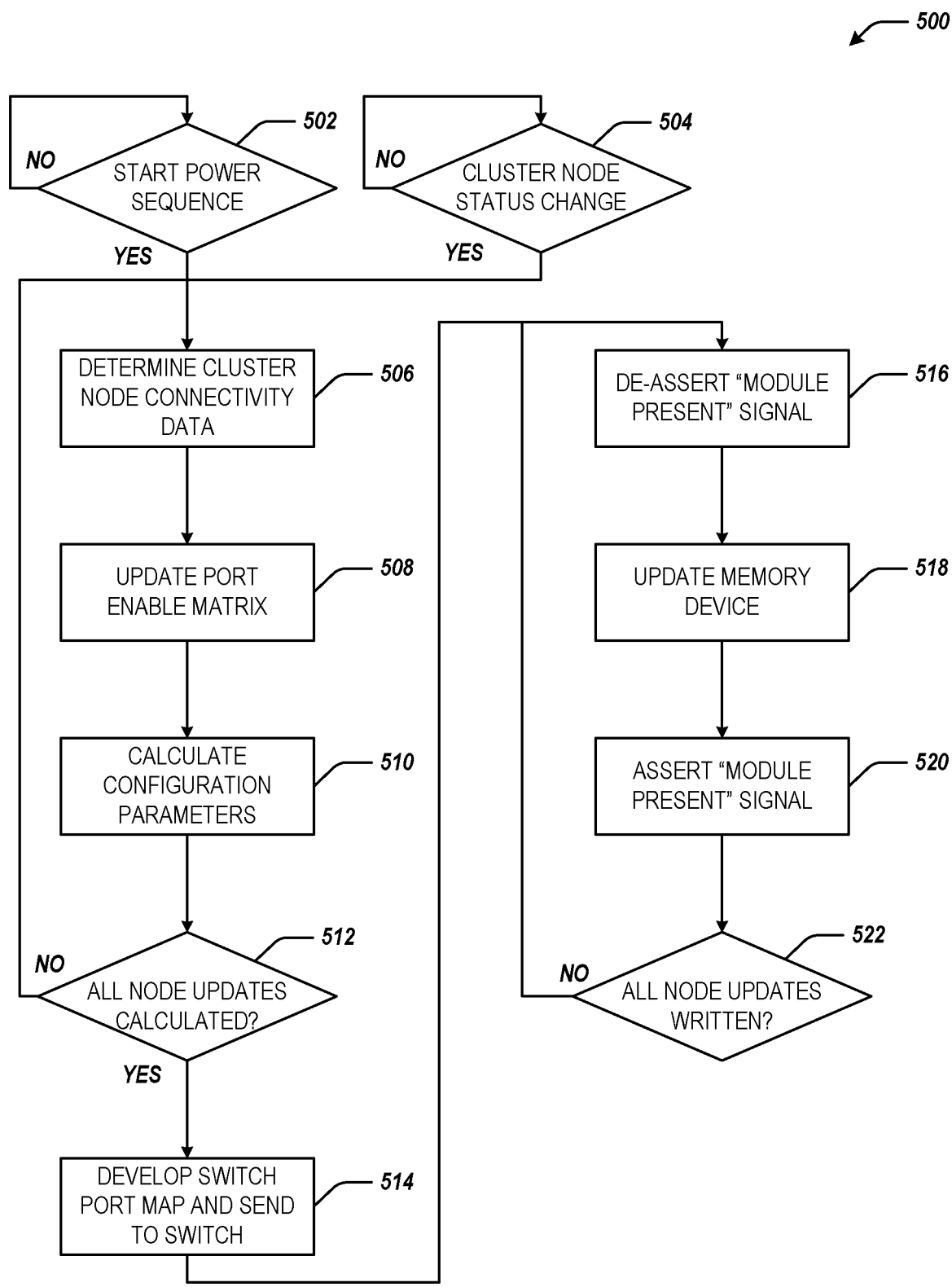
FIG. 5 is a flow diagram depicting an example method for fabric cable emulation.

FIG. 5 is a flowchart depicting an example method 500 for fabric cable emulation. Method 500 may be executed or performed, for example, by some or all of the system components described above in fabric cluster 100 of FIG. 1 and/or fabric configuration manger 300 of FIG. 3. Method 500 may be implemented in the form of executable instructions stored on at least one machine-readable storage medium of the fabric configuration manager and executed by at least one processor of the fabric configuration manager. Alternatively or in addition, method 500 may be implemented in the form of electronic circuitry (e.g., hardware). In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At blocks 502 and 504, method 500 may include monitor a fabric cluster for a cluster power sequence of the fabric cluster and a cluster node being inserted into the fabric cluster, respectively. As an example, fabric configuration manager 110 of fabric cluster 100 shown in FIG. 1 and/or fabric configuration manager 300 of FIG. 3 may be responsible for implementing blocks 502 and 504.

At block 506, in response to either a cluster power sequence of the fabric cluster or a cluster node being inserted into the fabric cluster, and for each cluster node in the fabric cluster, method 500 may include determining connection data associated with a connection between a fabric interface of the cluster node and a fabric switch of the fabric cluster. As an example, fabric configuration manager 110 of fabric cluster 100 shown in FIG. 1 and/or fabric configuration manager 300 of FIG. 3 may be responsible for implementing block 506. The connection may be implemented via a backplane of the fabric cluster.

At block 508, method 500 may include using the connection data determined at 506 to update a port enable matrix for the fabric cluster. As an example, fabric configuration manager 110 of fabric cluster 100 shown in FIG. 1 and/or fabric configuration manager 300 of FIG. 3 may be responsible for implementing block 508.

At block 510, method 500 may include calculating configuration parameters for the connection between the fabric interface of the cluster node and the fabric switch based on the connection data determined at 506. As an example, fabric configuration manager 110 of fabric cluster 100 shown in FIG. 1 and/or fabric configuration manager 300 of FIG. 3 may be responsible for implementing block 510.

At block 512, method 500 may include determining whether all cluster node updates have been calculated. As an example, fabric configuration manager 110 of fabric cluster 100 shown in FIG. 1 and/or fabric configuration manager 300 of FIG. 3 may be responsible for implementing block 510. Blocks 506-510 may be repeated for additional cluster nodes until all cluster node updates have been processed (512-YES).

At block 514, method 500 may developing a switch port map based on the configuration parameters calculated at 510 and sending the developed switch port map to the fabric switch. As an example, fabric configuration manager 110 of fabric cluster 100 shown in FIG. 1 and/or fabric configuration manager 300 of FIG. 3 may be responsible for implementing block 514.

At block 516, method 500 may include de-asserting a "MODULE PRESENT" interface signal to the fabric interface of the cluster node to indicate that the cluster node is not available in the fabric cluster. As an example, fabric configuration manager 110 of fabric cluster 100 shown in FIG. 1 and/or fabric configuration manager 300 of FIG. 3 may be responsible for implementing block 516.

At block 518, while the interface signal is de-asserted, method 500 may include storing the configuration parameters calculated at 510 in a memory device on the cluster node. As an example, fabric configuration manager 110 of fabric cluster 100 shown in FIG. 1 and/or fabric configuration manager 300 of FIG. 3 may be responsible for implementing block 518. In some implementations, storing the calculated configuration parameters in the memory device may include overwriting or replacing a set of initial configuration parameters stored in the memory device.

At block 520, method 500 may include asserting the interface signal to the fabric interface of cluster node to indicate to the fabric interface that the cluster node that the memory device has been updated with the calculated configuration parameters and that the cluster node is available in the fabric cluster. As an example, fabric configuration manager 110 of fabric cluster 100 shown in FIG. 1 and/or fabric configuration manager 300 of FIG. 3 may be responsible for implementing block 520.

At block 522, method 500 may include determining whether all calculated configuration parameters have been written to memory devices on cluster nodes to be updated. Blocks 516-520 may be repeated for additional cluster node updates. As an example, fabric configuration manager 110 of fabric cluster 100 shown in FIG. 1 and/or fabric configuration manager 300 of FIG. 3 may be responsible for implementing block 522.

Figure 6:
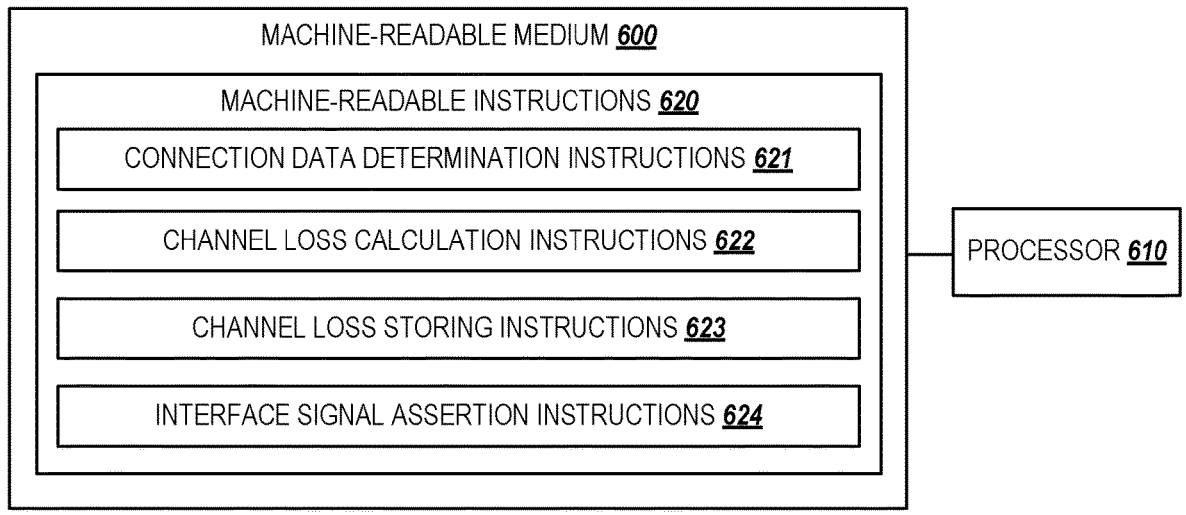
FIG. 6 is a block diagram of an example machine-readable medium for fabric cable emulation.

FIG. 6 is a block diagram of an example machine-readable medium 600 for fabric cable emulation. Machine-readable medium 600 may be communicatively coupled to a processor 610. Machine-readable medium 600 and processor 610 may, for example, be included as part of fabric cluster 100 illustrated in FIG. 1 and/or fabric configuration manager 300 illustrated in FIG. 3. For example, machine-readable medium 600 and processor 610 may be included in fabric configuration manager 110. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 610 may be central processing units (CPUs), microprocessors, and/or other hardware devices suitable for retrieval and execution of instructions stored in machine-readable storage medium 600. In the example shown in FIG. 6, processor 610 may fetch, decode, and execute machine-readable instructions 620 (including instructions 621-624) for variable cache flushing. As an alternative or in addition to retrieving and executing instructions, processor 610 may include electronic circuits comprising a number of electronic components for performing the functionality of the instructions in machine-readable storage medium 600. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 600 may be any electronic, magnetic, optical, or other physical storage device that stores executable instructions. Thus, machine-readable storage medium 600 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 600 may be disposed within a fabric configuration manager (e.g., fabric configuration manager 110 of FIG. 1, fabric configuration manager 300 of FIG. 3, etc.). In this situation, the executable instructions may be "installed" on the fabric configuration manager. Alternatively, machine-readable storage medium 600 may be a portable, external or remote storage medium, for example, that allows a fabric configuration manager to download the instructions from the portable/external/remote storage medium. In this situation, the executable instructions may be part of an "installation package". As described herein, machine-readable storage medium 600 may be encoded with executable instructions for fabric cable emulation.

Referring to FIG. 6, connection data determination instructions 621, when executed by a processor (e.g., 610), may cause the processor to, in response to a cluster node being inserted into a fabric cluster, determine connection data associated with a connection between a fabric interface of the cluster node and a fabric switch. In some implantations, the fabric interface of each cluster node in the fabric cluster may be connected to the fabric switch via a chassis backplane of the fabric cluster. In some implantations, the connection data may include a distance between the fabric interface of each cluster node and the fabric switch. Channel loss calculation instructions 622, when executed by a processor (e.g., 610), may cause the processor to, based on the determined connection data, calculate a channel loss for the connection between the fabric interface of the cluster node and the fabric switch.

Channel loss storing instructions 623, when executed by a processor (e.g., 610), may cause the processor to store the calculated channel loss in a memory device on each cluster node. For example, channel loss storing instructions 623 may be executable to store the calculated channel loss in the memory device on each cluster node by replacing an initial channel loss for the connection between the fabric interface of the cluster node and the fabric switch with the calculated channel loss. In some implementations, channel loss storing instructions 623 may be executable to de-assert an interface signal to the fabric interface of each cluster node to indicate that the cluster node is not available in the fabric cluster and store the calculated configuration parameters in the memory device on each cluster node while the interface signal is de-asserted.

Interface signal assertion instructions 624, when executed by a processor (e.g., 610), may cause the processor to, after storing the calculated channel loss in the memory device on each cluster node, asserting an interface signal to the fabric interface of each cluster node to indicate that the cluster node is available in the fabric cluster.

Figure 7:
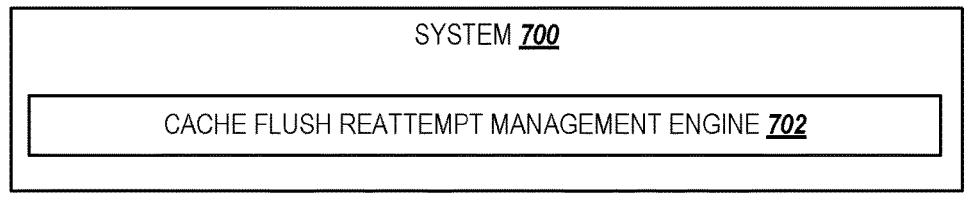
FIG. 7 is a block diagram of an example system for fabric cable emulation.

FIG. 7 is a block diagram depicting an example system 700 for fabric cable emulation. In some implementations, system 700 may include a fabric configuration management engine 702. In some examples, system 700 may be implemented by fabric cluster 100 of FIG. 1.

The term "engine", as used herein in reference to fabric configuration management engine 702 may refer to a combination of hardware and programming that performs a designated function or set of functions. For example, the hardware of fabric configuration management engine 702 may include a processor or both a processor and a machine-readable storage medium, while the programming may include instructions and/or code stored on the machine-readable storage medium that may be executable by the processor to perform the designated function(s).

In some implementations, fabric configuration management engine 702 may include a processor and program instructions that, when executed, cause the processor to calculate configuration parameters for a connection between a fabric interface and a fabric switch based on data associated with the connection. The fabric interface of the cluster node may be connected to the fabric switch via a chassis backplane of a fabric cluster. The data associated with the connection may include, for example, a cluster node identifier, a distance between the fabric interface of the cluster node and the fabric switch, and a fabric cluster communications standard type. The configuration parameters may include, for example, a channel loss for the connection between the fabric interface of the cluster node and the fabric switch. In some implementations, the program instructions, when executed, may cause the processor to determine the data associated with the connection between the fabric interface of the cluster node and the fabric switch in response to at least one of a cluster power sequence and the cluster node being inserted into the fabric cluster.

In some implementations, fabric configuration management engine 702 may include a processor and program instructions that, when executed, cause the processor to de-assert an interface signal to the fabric interface of the cluster node as an indication that the cluster node is not available in the fabric cluster and store the calculated configuration parameters in a memory device of the cluster node while the interface signal is de-asserted. In some implementations, fabric configuration management engine 702 may include a processor and program instructions that, when executed, cause the processor to, after storing the calculated configuration parameters in the memory device, assert the interface signal to the fabric interface of the cluster node as an indication that the cluster node is available in the fabric cluster.

Fabric configuration management engine 702 may include a processor and program instructions that, when executed, cause the processor to perform the above-described functions for each cluster node among a plurality of cluster nodes included in the fabric cluster. In such embodiments, system 700 may include the fabric switch, the backplane, and the plurality of cluster nodes connected to the fabric switch via the chassis backplane. In some implementations, system 700 may be included in a rack chassis and fabric configuration management engine 702 may be implemented by a chassis manager. Each cluster node in the fabric cluster may include and a memory device and a fabric interface. The memory device may store configuration parameters associated with the connection between the fabric interface and the fabric switch of the fabric cluster. The fabric interface may connect the cluster node to the fabric switch via the chassis backplane and may access configuration parameters (either initial or calculated) stored in the memory device via a low-speed sideband interface.

The foregoing disclosure describes a number of example implementations for fabric cable emulation. The disclosed examples may include systems, devices, machine-readable storage media, and methods for fabric cable emulation. For purposes of explanation, certain examples are described with reference to the components illustrated in FIGS. 1-3, 6, and 7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 4 and 5 are examples and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for fabric cable emulation, the method performed by a processor of a fabric configuration manager and comprising:
   determining connection data associated with a connection between a fabric interface of a cluster node in a fabric cluster and a fabric switch, the fabric interface being connected to the fabric switch via a chassis backplane;
   based on the determined connection data, calculating configuration parameters for the connection between the fabric interface of the cluster node and the fabric switch;
   storing the calculated configuration parameters in a memory device on the cluster node;
   after storing the calculated configuration parameters in the memory device, asserting an interface signal to the fabric interface of the cluster node to indicate that the cluster node is available in the fabric cluster; and
   determining the connection data associated with the connection between the fabric interface of the cluster node and the fabric switch in response to the cluster node being inserted into the fabric cluster.

2. The method of claim 1, comprising:
   de-asserting the interface signal to the fabric interface of the cluster node to indicate that the cluster node is not available in the fabric cluster; and storing the calculated configuration parameters in the memory device on the cluster node while the interface signal is de-asserted.

3. The method of claim 1, comprising:
accessing, by the fabric interface of the cluster node, the calculated configuration parameters stored in the memory device via a low-speed sideband interface.

4. The method of claim 1, wherein storing the calculated configuration parameters in a memory device comprises:
replacing initial configuration parameters for the connection between the fabric interface of the cluster node and the fabric switch with the calculated configuration parameters.

5. The method of claim 1, comprising:
determining the connection data associated with the connection between the fabric interface of the cluster node and the fabric switch during a cluster power sequence.

6. The method of claim 1, wherein the connection data associated with the connection between the fabric interface of the cluster node and the fabric switch includes a cluster node identifier and a distance between the fabric interface and the fabric switch.

7. The method of claim 6, wherein calculating the configuration parameters for the connection between the fabric interface of the cluster node and the fabric switch comprises:
calculating a channel loss for the cluster node based on the cluster node identifier and the distance between the fabric interface of the cluster node and the fabric switch.

8. A fabric cluster system, comprising:
a fabric configuration manager to, for each cluster node among a plurality of cluster nodes included in the fabric system:
calculate configuration parameters for a connection between a fabric interface of the cluster node and a fabric switch based on data associated with the connection, the fabric interface being connected to the fabric switch via a chassis backplane of the fabric cluster system;
de-assert an interface signal to the fabric interface of the cluster node as an indication that the cluster node is not available in the fabric cluster system;
store the calculated configuration parameters in a memory device on the cluster node while the interface signal is de-asserted; and
after storing the calculated configuration parameters in the memory device, assert the interface signal to the fabric interface of the cluster node as an indication that the cluster node is available in the fabric cluster system.

9. The fabric cluster system of claim 8, comprising:
the fabric switch;
the backplane;
the plurality of cluster nodes connected to the fabric switch via the chassis backplane, each cluster node among the plurality of cluster nodes comprising:
a fabric interface to connect the cluster node to the fabric switch via the chassis backplane; and
a memory device to store configuration parameters associated with the connection between the fabric interface and the fabric switch.

10. The fabric cluster system of claim 9, wherein fabric interface of the cluster node is to access the calculated configuration parameters stored in the memory device via a low-speed sideband interface.

11. The fabric cluster system of claim 9, wherein:
the fabric cluster system is included in a rack chassis; and
the fabric configuration manager is a chassis manager.

12. The fabric cluster system of claim 8, wherein the fabric configuration manager is to:
determine the data associated with the connection between the fabric interface of the cluster node and the fabric switch in response to at least one of a cluster power sequence and the cluster node being inserted into the fabric cluster system.

13. The fabric cluster system of claim 8, wherein the data associated with the connection between the fabric interface of the cluster node and the fabric switch includes a cluster node identifier, a distance between the fabric interface of the cluster node and the fabric switch, and a fabric cluster communications standard type.

14. The fabric cluster system of claim 13, wherein the configuration parameters include a channel loss for the connection between the fabric interface of the cluster node and the fabric switch.

15. A non-transitory machine-readable storage medium comprising instructions executable by a processor of a fabric configuration manager to:
in response to a cluster node being inserted into a fabric cluster, determine connection data associated with a connection between a fabric interface of the cluster node and a fabric switch, the fabric interface being connected to the fabric switch via a chassis backplane;
based on the determined connection data, calculate a channel loss for the connection between the fabric interface of the cluster node and the fabric switch;
store the calculated channel loss in a memory device on the cluster node;
after storing the calculated channel loss in the memory device, asserting an interface signal to the fabric interface of the cluster node to indicate that the cluster node is available in the fabric cluster;
de-assert the interface signal to the fabric interface of the cluster node to indicate that the cluster node is not available in the fabric cluster; and
store the calculated configuration parameters in the memory device on the cluster node while the interface signal is de-asserted.

16. The non-transitory machine-readable storage medium of claim 15, wherein the fabric configuration manager is connected to the memory device on a low-speed sideband interface.

17. The non-transitory machine-readable storage medium of claim 15, wherein the instructions are executable by the processor of the fabric configuration manager to:
store the calculated channel loss in the memory device on the cluster node by replacing an initial channel loss for the connection between the fabric interface of the cluster node and the fabric switch with the calculated channel loss.

18. The non-transitory machine-readable storage medium of claim 15, wherein the connection data includes a distance between the fabric interface of the cluster node and the fabric switch.

* * * * *